United States Patent [19]
Miller, II et al.

[11] Patent Number: 5,930,247
[45] Date of Patent: Jul. 27, 1999

[54] BROADBAND DATA RECEPTION SYSTEM FOR WORLDNET™ ACCESS

[75] Inventors: Robert Raymond Miller, II, Township of Morris; Ashok N. Rudrapatna, Basking Ridge; Jesse Eugene Russell, Piscataway, all of N.J.

[73] Assignee: AT&T Corp., Middletown, N.J.

[21] Appl. No.: 08/807,527

[22] Filed: Feb. 27, 1997

[51] Int. Cl.⁶ .............................. H04B 7/02; H04L 12/66
[52] U.S. Cl. ............................................ 370/338; 370/401
[58] Field of Search ....................................... 370/338, 400, 370/401, 420, 463, 480, 489, 490; 455/3.1, 3.2, 4.1, 5.1, 6.1, 6.2, 6.3; 348/6, 10, 12; 345/552

[56] References Cited

U.S. PATENT DOCUMENTS

| | | | |
|---|---|---|---|
| 5,347,304 | 9/1994 | Moura et al. | 348/12 |
| 5,471,474 | 11/1995 | Grobicki et al. | 370/437 |
| 5,608,446 | 3/1997 | Carr et al. | 348/6 |
| 5,708,961 | 1/1998 | Hylton et al. | 455/4.2 |
| 5,745,837 | 4/1998 | Fuhrmann | 455/5.1 |

*Primary Examiner*—Chi H. Pham
*Assistant Examiner*—Ricky Q. Ngo

[57] ABSTRACT

Termination equipment for a WorldNet™ wireless network receives packet data from a data terminal of a DirecTV™ Settop Box. This data is directed to a recipient through a router and transmitted by wireless or coax LAN to customer premises data equipment. Replies to the network by customer premises equipment are transmitted by wireless or coax LAN to the router to a CDPD radio modem for transmission, via CDPD, to a remote termination connected to the network.

7 Claims, 1 Drawing Sheet

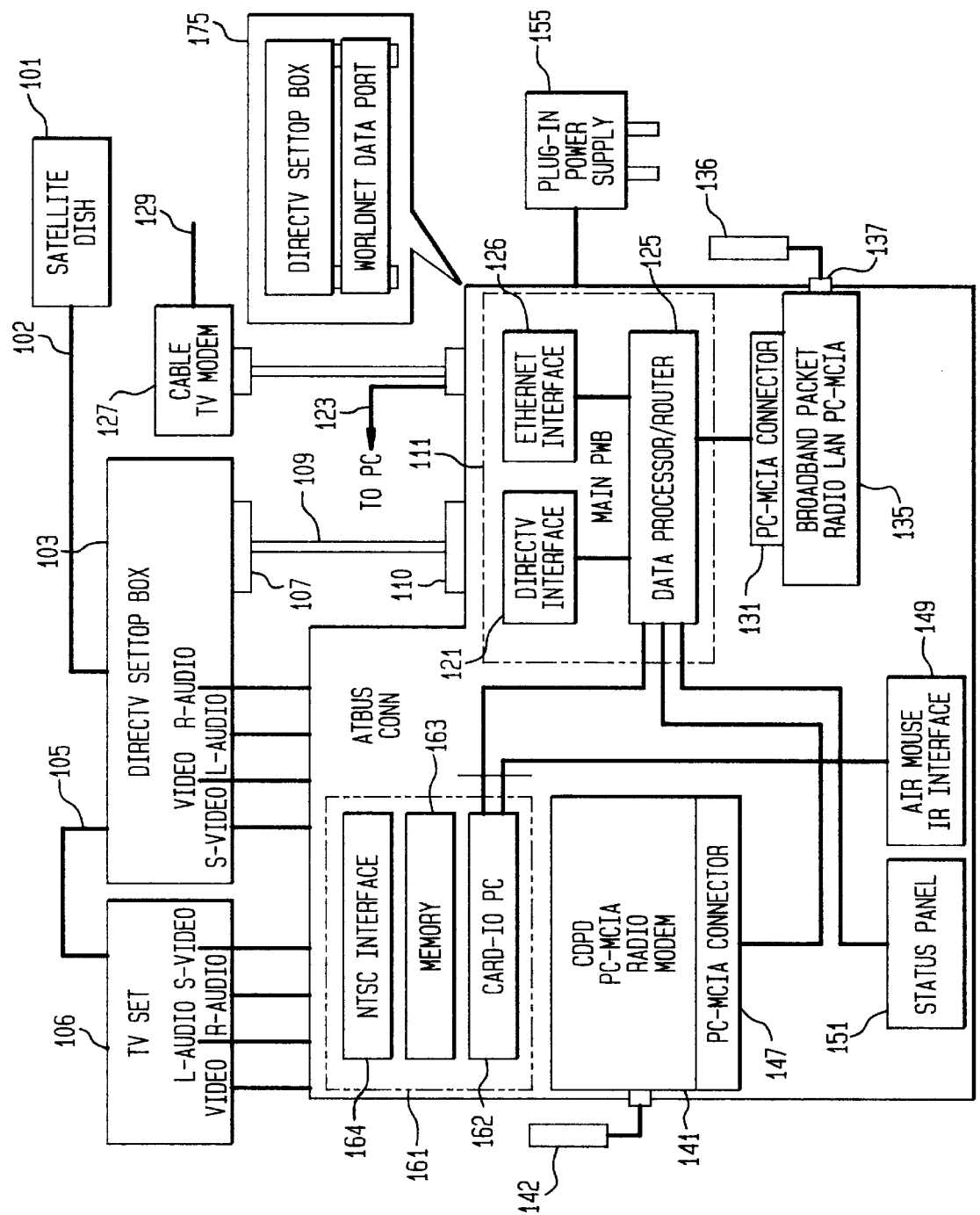

BROADBAND DATA RECEPTION SYSTEM FOR WORLDNET™ ACCESS

FIELD OF THE INVENTION

This invention relates to a data reception system including apparatus and methods for communicating data through a wireless TV connection device (i.e., a Settop Box ) and in particular to using a Settop Box receiver for receiving packet signals from a satellite transmission and accompanying means for data transmission to a wireless network, via a CDPD (Cellular Digital Packet Data) cellular network.

BACKGROUND OF THE INVENTION

Settop Boxes are designed in general to receive TV signals via broadband media such as satellite transmissions and cable connections. Because of the broad bandwidth of TV signals, Settop Boxes such as a DirecTV™ Settop Box have the capability for receiving data at high transmission rates. This capability is largely unused in other applications because of the singular application, concerning TV reception, accorded Settop Boxes. These applications use TV specific data compression techniques directed specifically to TV transmission and hence data transmission per se is not normally thought of as an application for the Settop Box.

SUMMARY OF THE INVENTION

Termination equipment for a WorldNet™ wireless network receives ATM (Asynchronous Transfer Mode) packet data from a data terminal of a DirecTV™ Settop Box. This data is directed to a recipient through a first input port of a directionally sensitive router (i.e., a packet direction is controlled within the router to be from an input port to an output port irrespective of header address) and transmitted by a subsequent wireless or coax LAN to customer premises data equipment. Replies to the network by customer premises equipment are transmitted by wireless or coax LAN to the directionally sensitive router and then from the router to a CDPD radio modem for transmission, via CDPD cellular, to a remote wireless termination connected to the wireless network.

BRIEF DESCRIPTION OF THE DRAWING

The sole FIGURE is a block diagram of a data processing/transceiver schema to receive data through a DirecTV™ Settop Box, couple it to a wireless LAN, and transmit outgoing data from the LAN as a CDPD transmission.

DETAILED DESCRIPTION

A system for WorldNet™ wireless network access, as shown in the the FIGURE, includes a dish antenna 101 for reception of broadband data and TV signals from a satellite transmitter or a microwave transmitter for example. It is connected by a coax cable (RG-6) 102 to a DirecTV™ Settop Box 103 which is primarily designed to receive compressed TV signals and decompress them and apply them, via a coax (RG-6) cable 105, to a TV set 106. (TV sets and settop boxes are consumer appliances which are readily available and need not be described herein). Settop Box 103 has a wideband capacity for handling television signals and in many cases the device has a non-TV data output port. It is primarily a receiving device and normally does not transmit signals. Signals are received primarily from satellite dish antenna 101. The received signals are normally compressed TV signals which are subsequently decompressed for viewing. Data signals are extracted before any decompression processing. The Settop Box herein includes a data port 107 which is connected by a multi-conductor cable 109 to an input port 110 of a WorldNet™ Data Port 111.

The WorldNet™ data port 111 includes a a DirecTV™ Settop Box interface 121 connected to the multi-conductor cable 109, via its input port 110. Such interface may be designed in accord with operational descriptions provided upon request by the Hughes Corp.

The output of the interface 121 is connected to a directionally sensitive Data Processor/Router 125. Router 125 reads packet header address information and uses this information to determine an ultimate address for the packet. The receiving port identity of the router determines the proper router output of the packet. Its ultimate address, after exiting the router, is determined by the the packet header which directs the packet to its intended destination after leaving the router.

Router 125 is direction sensitive having controlling algorithms for directing packets from a particular input to go to a particular output of the router. Ultimate packet destinations are of course controlled by a packet header address.

Packets received by the router from interface 121 are directed to the broadband Packet Radio LAN PC-MCIA 135. Packets returned from LAN PC-MCIA 135 are directed by the router 125 to a CDPD modem 141. While this operates differently from the traditional router, in which packet directionality is based solely on a header address, its design will be readily apparent to those skilled in the art.

An EtherNet™ processor station 126, also connected to router 125, connects to a cable TV modem 127 receiving TV signals or data information, via coax (RG-6) cable 129. In appropriate circumstances the EtherNet™ processor station may be a LAN station permitting the transmission of data into the LAN. Such a processor is provided commercially by Motorola identified commercially as MC 68360. As shown output cable 123 may be connected to a wired PC. The router 125 may also directly couple the EtherNet™ station to radio modem 141 for sourcing CDPD transmissions.

Router 125, of data port 111, is connected, via PC-MCIA (Personal Computer Memory Card Industry Association) connector devices 131, to a broadband Packet Radio LAN PC-MCIA 135. PC-MCIA is a commercially available plug-in card that includes a radio transceiver and a ¼ wave vertical antenna 136 for RF transmission and reception. Hence packets may be sent by radio and received as an RF radio signal. Router 125 is capable of handling received packets and at a certain input and forwarding them to an input dependent output due to the routers input controlled directional sensitivity. Wireless packets from the LAN, received via the antenna 136 and the packet radio 135 are coupled to a PC-MCIA radio modem 141, as discussed below. This packet radio unit 135 communicates through an antenna 136 for providing radio transmission and reception of packets to and from a wireless LAN. Unit 135 also includes a cable connection 137 for wired access to cable connected LANs.

The data port 111 is also connected, through the router 125 to the radio modem 141 which is a PC-MCIA card containing a CDPD radio modem for communicating, via a ¼ wave vertical antenna 142 with a CDPD (Cellular Digital Packet Data) wireless packet network. CDPD is a commercially available service and is well known to those skilled in the art. Its primary value is as a back-channel for internet surfing where the downlink is via DirecTV™ service. This unit also provides the capability for the LAN to communicate outside the LAN with other data systems through the router 125 and CDPD modem 141 to a CDPD wireless network. It receives its data packets for transmission directly from the router 125, via lead 147, and transmits them by radio transmission (i.e., cellular transmission) to a cellular CDPD wireless system via it output antenna 142.

A status panel 151 is connected to and permits monitoring of the operational status of the Router 125. A power supply 155 is used to power the interfaces and the router. It may function through AC-to-DC conversion from a power outlet or in certain instances be comprised of a battery pack.

An optional Printed Wiring Board (PWB) 161 may be included in the data processing system and is used to control communications between a user and the TV and Settop Box. An example is the use of an air mouse 149, which communicates with the PWB by an infrared signal. This may be used for cursor control on the TV screen. This PWB is technically embodied similar to a browser circuit for web TV services and is well understood by those skilled in the art. Such a PWB includes an IO PC on a card 162, a memory 163 and a NTSC (i.e., National Television Standards Committee) interface 164 which is interconnected to the TV 106 and the DirecTV™ Settop Box. This allows for various data/audio transfers between the Settop Box 107 and TV 106 and/or stereo equipment.

The schematic 175 illustrates a possible physical size relation of the data port and the Settop Box.

The invention claimed is:

1. A customer premises termination system for receiving data, via wireless communications, from a remote data network through a customer premises data terminal of a Settop Box and communicating data to a CDPD network, comprising:

a data receiving interface device coupled to the data terminal of the Settop Box;

a data processor/router connected to the interface device and directionally processing incoming data packets to go to a router specified output of the data processor/router, in that packet direction is controlled within the router to be from an input port to an output port irrespective of header address of the packet;

a wireless broadband duplex packet LAN, including an antenna, for two way wireless coupling of the data processor/router with a customer premises LAN/data processor; and a CDPD radio modem connected to the data processor/router for receiving packets from the router and transmitting wireless CDPD packets generated by the customer premises LAN data processor.

2. A customer premises termination system for receiving data, as claimed in claim 1, including an EtherNet™ station/interface unit coupled to a cable modem and to the data processor router for transmitting data signals from the cable modem to the data processor router and from the router to the modem wherein the EtherNet™ station/interface is an active LAN station.

3. A customer premises termination system for receiving data, as claimed in claim 1, including a status indicator panel connected to the data processor router.

4. A termination system as claimed in claim 1, comprising:

a control card connected to the Settop Box and a TV set and having and having an IR interface for receiving IR control signals from a user.

5. A method of receiving and transmitting data from a wireless network through a data terminal of a Settop Box and communicating data to a CDPD network through a wireless transmit terminal and to a wireless LAN via a router, comprising the steps of:

receiving a wideband data signal in packet format through a Settop Box;

coupling the received wideband data packet signal to a directionally sensitive router, in which packet direction is controlled within the router to be from a designated input port to a designated output port irrespective of header address of the packet, and directing the data packet to a LAN according to router directionality control;

receiving packets from the LAN at the router and coupling them according to router directionality control to a CDPD modem for transmission to a CDPD wireless network.

6. A method of receiving and transmitting data, as claimed in claim 5, comprising the steps of:

directing packets received by the router to a radio for radio transmission to a LAN; and receiving packets from the LAN for application to the router by radio transmission.

7. A method of receiving and transmitting data, as claimed in claim 6, comprising the steps of:

receiving data by DirecTV™ Settop Box and directly coupling the data to a CDPD modem for transmission to a CDPD cellular network.

* * * * *